Aug. 28, 1934.　　　F. S. KINGSTON ET AL　　　1,971,417
MOTOR SUPPORT
Filed June 4, 1932
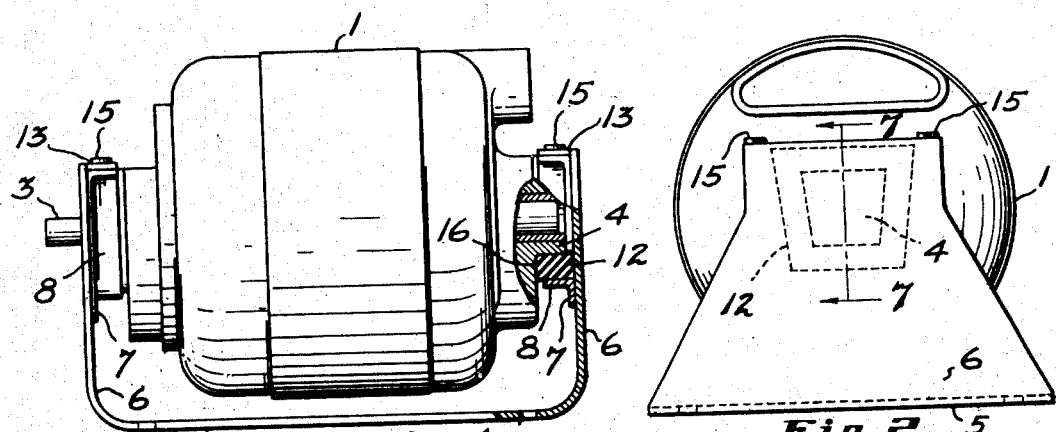
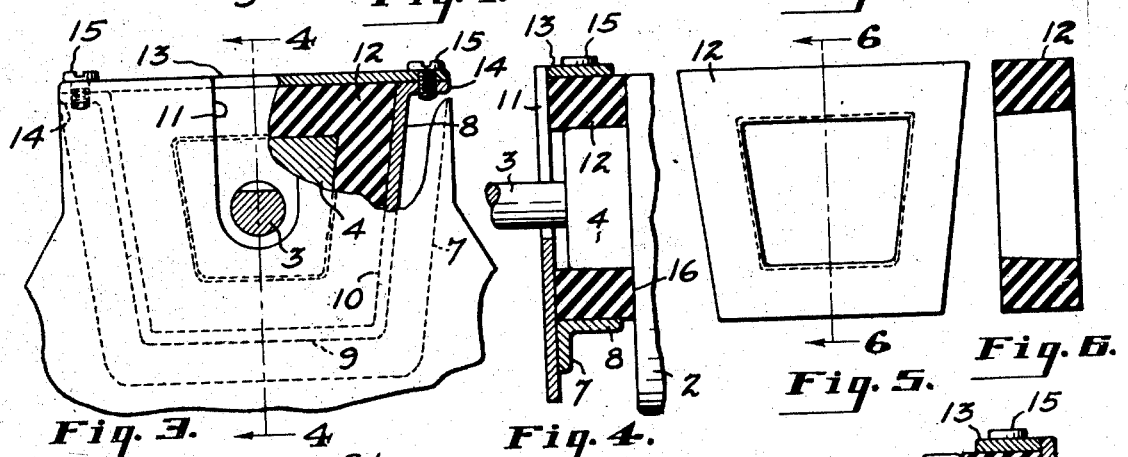
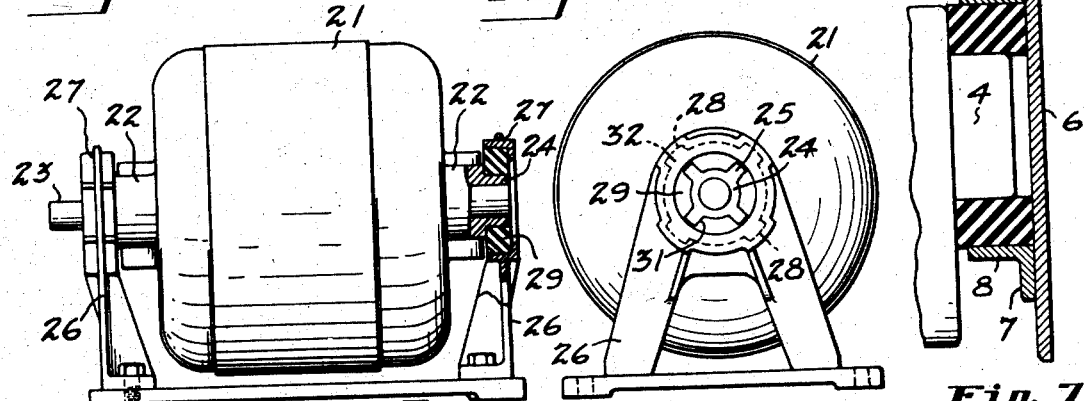
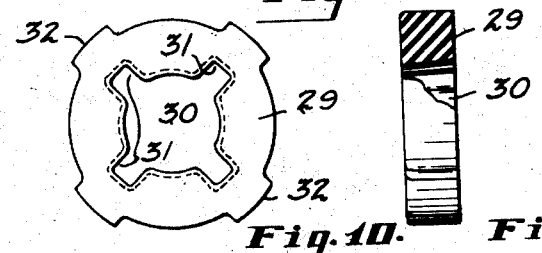
INVENTORS
Frederick S. Kingston
Brooks L. Conley
BY Evans & McCoy
ATTORNEYS Patented Aug. 28, 1934

1,971,417

UNITED STATES PATENT OFFICE 1,971,417

MOTOR SUPPORT

Frederick S. Kingston and Brooks L. Conley, Warren, Ohio; said Kingston assignor, by mesne assignments, to General Motors Corporation, Detroit, Mich., a corporation of Delaware Application June 4, 1932, Serial No. 615,392

6 Claims. (Cl. 248—16)

This invention relates to supports for dynamo-electric machines, particularly electric motors, and has for its object to provide a yielding support for the housing of such a machine which will effectively dampen vibrations set up in the housing due to rapid rotation of the armature therein and prevent transmission of vibrations to the supporting structure, thereby insuring smooth and noiseless operation.

A further object is to provide vibration dampening cushions for the bearing bosses of the housing in which the armature shaft is journalled, which permit slight gyratory movements of the housing, thereby lessening the wear on the shaft bearings and absorb radial, torsional and axial vibrations.

A further object is to provide cushioning bearings for the housing, such that the motor or dynamo can be quickly and easily mounted in the support, or can be easily and quickly removed therefrom.

A further object is to provide one-piece cushioning blocks so mounted on the bearing portions of the housing and within bearing pockets of supporting members that they serve to effectively cushion torsional and other thrusts transmitted through the housing to the supports.

With the above and other objects in view, the invention may be said to comprise a structure as illustrated in the accompanying drawing hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is a side elevation of a motor mounting embodying the invention; the support at one end being broken away and shown in section;

Fig. 2 is an end elevation of a motor and motor support shown in Fig. 1;

Fig. 3 is a fragmentary end elevation on an enlarged scale looking toward the end of the motor opposite that shown in Fig. 2;

Fig. 4 is a section taken on the line indicated at 4—4 in Fig. 3;

Fig. 5 is a side elevation of a cushioning block;

Fig. 6 is a section taken on the line indicated at 6—6 of Fig. 5;

Fig. 7 is a section taken on the line indicated at 7—7 in Fig. 2;

Fig. 8 is a side elevation showing a modified form of motor mounting;

Fig. 9 is an end elevation of the motor and support shown in Fig. 8;

Fig. 10 is a side elevation of the modified form of cushioning block shown in Figs. 8 and 9;

Fig. 11 is a section taken on the line indicated at 11—11 in Fig. 10.

One structure embodying the invention is illustrated in Figs. 1 to 7 of the drawing which shows a cushioned mounting for a dynamo-electric machine having a housing 1 enclosing the stator and rotor or armature of the machine, the housing 1 being provided at the ends thereof with bearing portions 2 which may be in the form of integral bosses disposed axially of the housing and projecting from the ends thereof, these bosses providing bearing supports for an armature shaft 3. Each boss or bearing portion 2 has a reduced end portion 4 which is adapted to non-rotatably engage a cushioning and supporting member, the end portion 4 being preferably of non-circular form so that it will not turn within a supporting member in which it is mounted.

As herein shown, the projecting bearing portion 2 has a cylindrical bore in which the armature shaft 3 is journalled and the external form of the reduced end portion 4 thereof is trapezoidal. The housing 1 is mounted upon a supporting member 5 which may be formed of a sheet metal plate having its end bent upwardly to provide a flat bottom and supporting standards 6 which are spaced apart a distance but slightly greater than the axial length of the housing so that the housing can be lowered between the standards with the ends of the bearing projections closely adjacent the standards. The flat bottom portion of the supporting member may be attached in any suitable manner to a supporting base.

Means is provided upon the inner sides of the standards 6 for supporting the bearing projections of the housing. To provide supports for the housing, supporting plates 7 are welded or otherwise secured to the inner faces of the standards 6 and each of these plates is provided with an inwardly projecting flange 8 of a shape to provide an open top supporting pocket. The pockets formed by the flanges 8 projecting inwardly from the standards have flat base portions 9 and downwardly converging sides 10 which have a taper corresponding to that of the converging sides of the trapezoidal end portion 4 of the housing bosses, the pockets, however, having a width and depth greater than that of the bosses. One of the standards 6 has a vertical shaft receiving slot 11 extending downwardly from the upper edge thereof centrally of the bearing pocket to accommodate the armature shaft 3 when the bearing bosses are lowered into the pockets.

On each of the reduced end portions 4 of the bearing bosses, there is mounted a cushioning block 12 formed of elastic rubber which is of trapezoidal form and of a size to fit within one of the bearing pockets, each block 12 having a trapezoidal aperture within which the end portion 4 of a housing boss fits. The height of the trapezoidal block 12 corresponds to the depth of the pocket and the block is retained within the pocket by means of a cover plate 13 which is secured to its ends to the horizontal end portions 14 of the flange 8 by means of screws 15.

The thickness of the block 12 is preferably greater than the width of the flange 8 so that the block projects beyond the inner edge of the flange, and the inner face of each block is engaged by a shoulder 16 on the bearing boss 2 at the inner end of the reduced portion 4 thereof.

In mounting a motor on the support the cushioning blocks 12 are slipped onto the reduced end portions 4 of the housing bosses and the housing 1 is then lowered into place between the standard 6 until the elastic bearing blocks 12 are seated in the bearing pockets of the standards. The cover plates 13 are then bolted on to secure the motor in place.

The torsional thrust transmitted through the housing to the supports is cushioned by the blocks 12 since the corners of the trapezoidal portions of the bearing bosses provide radial projections engaging the elastic cushioning blocks which transmit torsional thrust to the blocks which yieldingly resist turning movements of the housing. Each cushioning block 12 is held against turning movements in the pockets by reason of its trapezoidal shape and only the slight turning movements permitted by the elasticity of the rubber can be imparted to the housing. The torsional vibrations set up in the housing, due to the rapid rotation of the armature therein, are effectively dampened by the rubber cushioning blocks and are not transmitted to the supporting structure. The movements of the housing transverse to its axis are also limited, and any vibrations in a lateral direction are effectively dampened. Since the blocks 12 have a close fit between the inner faces of the standards 6 and the shoulders 16 on the projecting bosses of the housing, the housing may have slight vibratory movements in an axial direction, but these vibrations are effectively dampened by the cushioning blocks 12 interposed between the shoulders 16 and the inner faces of the standards, so that these vibrations are not transmitted to the supporting structure. The elastic cushioning blocks permit the housing to have slight endwise movements and slight angular movements about its own or a transverse axis so that accurate alinement of the shaft 3 with a driving or driven element is not essential. In addition the housing is permitted a slight gyratory motion during operation which materially lessens the wear on the armature shaft bearings. The motor housing is thus yieldably supported by the cushioning blocks and is permitted to have gyratory movements and vabratory movements in any direction but, since these movements do not transmit vibrations to the motor supporting structure, the operation of the motor is smooth and noiseless.

In Figs. 8 to 11 of the drawing there is shown a second embodiment of the invention, in which a motor housing 21 has axial bearing projections 22 at its end in which an armature shaft 23 is journaled, and in which the housing is mounted in cushioning supports of somewhat different construction. In this modification the projecting bearing portions 22 of the housing have reduced end portions 24 which have angularly spaced, radially projecting ribs 25. The housing is in this instance supported in bearing brackets 26 at the opposite ends thereof, and these brackets have annular bearing pockets 27, the peripheral walls of which are provided with angularly spaced recesses 28. Cushioning blocks 29, formed of yielding, elastic material, preferably rubber, fit within the annular pockets 27 of the supporting brackets and each block is provided with a central aperture 30 of a size to fit over the reduced ends 24 of the bearing bosses and provided with recesses 31 to receive the ribs 25. Cushioning blocks 29 are also provided with peripheral ribs 32 which fit in the recesses 28 of the annular pockets of the supporting brackets.

The interfitting ribs and recesses of the housing bosses and cushioning blocks and of the cushioning block and bearing brackets hold the blocks against rotation on the housing projections and against rotation within the pockets of the brackets. The only angular movements permitted the housing are those which are permitted by the yielding of the elastic rubber cushioning block, and the only lateral movements of the housing are those permitted by the yielding of the elastic blocks. Axial movements of the housing are also cushioned, the elastic blocks 29 being interposed between short inwardly projecing flanges 33 on the bearing brackets around the margins of the block receiving pockets which engage the outer face of the blocks adjacent their periphery, and shoulders 34 on the housing bosses 15 at the inner ends of the reduced portions 24 thereof, which engage the inner face of the blocks around the margin of the central openings of the blocks.

The bearing brackets 26 are detachably secured to a suitable base member 35 by means of bolts 36 so that they can readily be removed from the projecting bosses of the motor housing. In assembling the motor on the supports, one of the brackets is secured to the base member 35, the blocks 29 are placed upon the ends of the projecting housing bosses and the shaft 24 is inserted through the aperture of the fixed bracket and the housing is moved axially until the cushioning block 29 is seated in the pocket of the fixed bracket. The other bracket is then slipped over the cushioning block at the opposite end of the housing and bolted to the base.

It will be apparent that the present invention provides a simple and inexpensive mounting for dynamo-electric machines, particularly electric motors, upon which the machine may be quickly and easily assembled, and which permits gyratory and vibratory movements of small amplitude but prevents transmission of vibrations to the supporting structure, thereby reducing the wear on the armature shaft bearings and insuring smooth and noiseless operation of the machine.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. In a device of the character described, a bearing member of polygonal form in cross section, a shaft journaled in said bearing member, a cushioning block having a polygonal aperture in which said bearing member fits, said block having exterior faces parallel with the walls of said aperture, a supporting member having a recess open at one side in which said block fits, and a removable cover plate for retaining the block in said recess.

2. The combination with a dynamo-electric machine having a housing provided with axially disposed projecting bosses at its ends which are externally non-circular and an armature shaft journaled in said bosses, of a pair of supporting members one at each end of said housing, and a block of elastic rubber non-rotatably mounted in each of said supporting members, each rubber block having a non-circular aperture in which one of said non-circular bosses fits, said housing and said supporting members having shoulders engaging the inner and outer faces of the cushioning blocks.

3. The combination with a dynamo-electric machine having a housing provided with axially disposed projecting bosses at its ends which are externally non-circular and an armature shaft journaled in said bosses, of a pair of supporting members one at each end of said housing, and a block of elastic rubber non-rotatably mounted in each of said supporting members, each rubber block having a non-circular aperture in which one of said non-circular bosses fits, said housing having a shoulder engaging the inner face of each cushioning block around the margin of the boss receiving opening and said supporting members each having a shoulder engaging the outer face of the block mounted therein along its outer margin.

4. The combination with a dynamo-electric machine having a housing provided with axially disposed projecting bosses at its ends which are externally non-circular, and an armature shaft journaled in said bosses, supporting member at each end of the housing, a cushioning block of elastic material for each boss, each block having an aperture in which one of the non-circular bosses fits, each block being of trapezoidal form, a standard at each end of the housing, each standard having downwardly tapering pocket open at the top into which a cushioning block may be lowered and in which the block fits, and detachable cover plates across the tops of said pockets for retaining the blocks therein.

5. The combination with a dynamo-electric machine having a housing provided with axially disposed projecting bearing portions at its ends, and an armature shaft journaled in said bearing portions, supporting members at opposite ends of the housing provided with bearing pockets, a one-piece cushioning ring of yielding elastic material non-rotatably secured upon each projecting bearing portion of the housing and non-rotatably secured in one of said bearing pockets, said projecting bearing portions having shoulders bearing against the inner faces of said rings and said supporting members having shoulders holding said rings against outward movement whereby axial movements of the housing are cushioned.

6. The combination with a dynamo-electric machine having a housing provided with axially disposed bearing portions projecting at opposite ends thereof and an armature shaft journaled in said bearing portions, a supporting member in the form of a plate bent to U-shape to provide a flat base and end standards, each standard having a bearing pocket on its inner face open at the top and tapering downwardly, one of said standards having a shaft receiving slot extending downwardly from the top thereof centrally of a pocket, a cushioning block of yielding elastic material non-rotatably mounted on each of said bearing portions, each block fitting in one of said bearing pockets, and a cover plate detachably secured to the standards and extending across the top of the pockets to retain the cushioning blocks therein.

FREDERICK S. KINGSTON.
BROOKS L. CONLEY.